United States Patent
Ackermann-Markes et al.

(10) Patent No.: US 7,961,718 B2
(45) Date of Patent: Jun. 14, 2011

(54) METHOD FOR SETTING UP A CONNECTION TO A TERMINAL VIA A COMMUNICATION DEVICE, AND A TERMINAL AND A COMMUNICATION DEVICE FOR IMPLEMENTING THE METHOD

(75) Inventors: Achim Ackermann-Markes, Wörthsee (DE); Jürgen Brieskorn, Geltendorf (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 859 days.

(21) Appl. No.: 11/442,906

(22) Filed: May 30, 2006

(65) Prior Publication Data

US 2006/0268752 A1    Nov. 30, 2006

(30) Foreign Application Priority Data

May 30, 2005   (DE) .......................... 10 2005 024 633

(51) Int. Cl.
*H04L 12/28* (2006.01)
*H04L 12/56* (2006.01)
*H04L 12/66* (2006.01)

(52) U.S. Cl. ........ 370/352; 370/254; 370/356; 370/389; 370/401; 370/463

(58) Field of Classification Search ........... 370/230–503
See application file for complete search history.

(56) References Cited

U.S. PATENT DOCUMENTS

| | | | |
|---|---|---|---|
| 5,999,525 A * | 12/1999 | Krishnaswamy et al. .... | 370/352 |
| 6,343,083 B1 * | 1/2002 | Mendelson et al. .......... | 370/466 |
| 6,498,791 B2 * | 12/2002 | Pickett et al. ................ | 370/353 |
| 6,614,781 B1 * | 9/2003 | Elliott et al. ................. | 370/352 |
| 6,687,245 B2 * | 2/2004 | Fangman et al. ............. | 370/356 |
| 6,714,536 B1 * | 3/2004 | Dowling ....................... | 370/356 |
| 6,744,759 B1 * | 6/2004 | Sidhu et al. .................. | 370/356 |
| 6,765,931 B1 * | 7/2004 | Rabenko et al. ............. | 370/493 |
| 6,775,273 B1 * | 8/2004 | Kung et al. ................... | 370/356 |
| 7,006,614 B2 * | 2/2006 | Feinberg et al. ............. | 379/164 |
| 7,068,646 B2 * | 6/2006 | Fangman et al. ............. | 370/352 |
| 7,068,647 B2 * | 6/2006 | Fangman et al. ............. | 370/352 |
| 7,120,139 B1 * | 10/2006 | Kung et al. ................... | 370/352 |
| 7,277,424 B1 * | 10/2007 | Dowling ....................... | 370/352 |
| 7,286,520 B2 * | 10/2007 | Takeda et al. ................ | 370/349 |
| 7,372,809 B2 * | 5/2008 | Chen et al. ................... | 370/229 |
| 7,379,455 B2 * | 5/2008 | Pickett ......................... | 370/389 |
| 7,453,852 B2 * | 11/2008 | Buddhikot et al. ........... | 370/331 |
| 7,564,840 B2 * | 7/2009 | Elliott et al. ................. | 370/356 |
| 7,577,150 B2 * | 8/2009 | Poustchi et al. ............. | 370/395.3 |
| 7,701,954 B2 * | 4/2010 | Rabenko et al. ............. | 370/401 |

(Continued)

FOREIGN PATENT DOCUMENTS

DE         101 19 447 A1      10/2002

(Continued)

*Primary Examiner* — Ayaz R Sheikh
*Assistant Examiner* — Venkatesh Haliyur
(74) *Attorney, Agent, or Firm* — Buchanan Ingersoll & Rooney PC

(57) ABSTRACT

A connection addressed via a directory number is set up to a terminal by setting up a partial connection to a communication device, with determined additional information being conveyed to the communication device as part of the partial connection. As a result of said partial connection and depending on the additional information conveyed, the partial connection is further switched to the terminal by the communication device.

13 Claims, 14 Drawing Sheets

U.S. PATENT DOCUMENTS

| | | | |
|---|---|---|---|
| 7,706,359 B2 * | 4/2010 | Pounds et al. | 370/353 |
| 2003/0137959 A1 * | 7/2003 | Nebiker et al. | 370/338 |
| 2005/0235352 A1 * | 10/2005 | Staats et al. | 726/14 |
| 2006/0143262 A1 * | 6/2006 | Cromer et al. | 709/201 |
| 2006/0187900 A1 * | 8/2006 | Akbar | 370/352 |
| 2006/0221933 A1 * | 10/2006 | Bauer et al. | 370/352 |

FOREIGN PATENT DOCUMENTS

| | | |
|---|---|---|
| EP | 1 526 697 A2 | 4/2005 |

* cited by examiner

METHOD FOR SETTING UP A CONNECTION TO A TERMINAL VIA A COMMUNICATION DEVICE, AND A TERMINAL AND A COMMUNICATION DEVICE FOR IMPLEMENTING THE METHOD

CROSS REFERENCE TO RELATED APPLICATIONS

This application claims priority of German application No. 102005024633.8 DE filed May 30, 2005, which is incorporated by reference herein in its entirety.

FIELD OF INVENTION

The present invention relates to a method for setting up a connection to a terminal via a communication device, and a terminal and communication device for implementing the method.

BACKGROUND OF INVENTION

Office workstations are usually equipped with a workstation computer, also called a PC, and a telephone, with said workstation computer generally being connected to a packet-switched, local data network referred to as a LAN (LAN: Local Area Network). The workstation computer furthermore frequently supports what is termed the TCP/IP protocol (TCP: Transmission Control Protocol, IP: Internet Protocol) for data communication with other workstation computers or service-providing server computers, with said computers being addressed within the data network via IP addresses.

The telephone, if forming part of a packet-switched communication system, is customarily also addressed via IP addresses and is referred to frequently as an IP telephone or IP terminal.

The use of IP telephones is advantageous to the extent that an existing infrastructure of a data network already in place can be employed.

When an IP telephone and workstation computer are employed at an office workstation, it is customary for two IP addresses (for the workstation computer and for the IP telephone) to be set up in the network for each office workstation, whereas only a single IP address for the workstation computer is required when circuit-oriented telephones of a circuit-oriented communication system are used.

Only a limited number of IP addresses can be assigned in data networks and their subnetworks. It can consequently be disadvantageous in data networks having an especially large number of IP-based terminals if too many IP addresses have to be allocated and hence few or no free IP addresses are available.

Owing to such limitations in the number of IP addresses in a data network, subnetworks are frequently formed whose IP addresses are not made public; they are only valid locally and so cannot be addressed from outside the subnetwork. Private IP addresses of said type can be multiply assigned because the same IP address can be used in different subnetworks. What is disadvantageous therein is that computers or IP telephones having such private IP addresses cannot be addressed from outside the subnetwork.

It is further known that, for example, computers or terminals in the data network are frequently each assigned an IP address dynamically immediately on being switched on and/or activated. Dynamically assigned IP addresses of said type are usually released again when the relevant computer or device is deactivated and/or switched off. The assigning and/or releasing of IP addresses is frequently performed by what is termed a DHCP server (DHCP: Dynamic Host Configuration Protocol).

SUMMARY OF INVENTION

An object of the present invention is to disclose a method able to manage with few IP addresses for setting up a connection to a first terminal; it extends further to disclosing a terminal and a communication device for implementing said method.

Said object is achieved by a method and communication device according to the independent claims. Advantageous embodiments and developments of the invention are indicated in the dependent claims.

In the inventive method for setting up a connection to a terminal, said terminal is coupled via a packet-oriented network, in particular a local area network LAN, to a communication device and a connection controller. The terminal is in particular an IP telephone, what is termed an IP softclient in the form of an IP telephone application or a PC multimedia application. The connection controller is in particular a gatekeeper or an H.323 or SIP gateway (H.323: Protocol conforming to the ITU-T recommendation—ITU-T: International Telecommunication Union—Telecommunications Standardization Sector; SIP: Session Initiation Protocol). The communication device can therein preferably be a software application on a PC. The terminal has been assigned a directory number via which it can be logically addressed for a connection. The terminal has further been assigned a first hardware address, in particular a MAC address (MAC: Media Access Control) or a Layer 2 address of the OSI Reference Model (OSI: Open Systems Interconnection) of the ISO (International Standardization Organization) via which it can be addressed in the network. The communication device has been assigned a second hardware address via which it can be addressed in the network, with said second hardware address being assigned a first network address, in particular an IP address, a Layer 3 address of the OSI Reference Model, or a higher-layer address. The directory number is assigned the first network address as well as additional information, in particular an address supplement, a port number, an address portion of what is termed a socket, and/or a protocol supplement by the connection controller. The additional information is furthermore assigned the first hardware address by the communication device. The connection, addressed via the directory number, to the terminal is set up by the connection controller's determining the first network address assigned to the directory number and the additional information assigned to the directory number and also the second hardware address assigned to the first network address that has been determined. Based on this second hardware address a partial connection is set up to the communication device addressed by the second hardware address that has been determined, with the determined additional information being conveyed to the communication device as part of said partial connection. As a result of this said partial connection and depending on the additional information conveyed, the first hardware address assigned thereto is determined. The partial connection is further switched by the communication device to the terminal with said first hardware address.

Each of the hardware addresses can preferably be an address permanently and/or immutably assigned to the relevant device. Said permanent assignment can in particular have been predefined by the manufacturer, as is the case, for instance, with what are termed MAC addresses. The first network address can have been assigned to the second hardware address preferably dynamically, with said assignment able to be administered and/or stored in each network element present in the LAN and/or in a DHCP server.

The additional information according to the above embodiment can generally be regarded as a criterion on the basis of which the communication device can decide for which of a plurality of terminals or applications the connection request is intended. A distinction between the terminals requiring to be connected can also be made by, for example, distinguishing different protocols used. A distinction of said kind based on the protocol, on information conveyed as part of the protocol, or on other criteria should therein be interpreted as a distinction by means of additional information, provided different terminals can be addressed by means of a criterion of said type.

This method is advantageous to the extent that while only a single network address is required for the terminal and communication device, both devices can nonetheless be addressed in the network and are accessible for services.

The inventive communication device for setting up a connection via a packet-oriented network to a called terminal coupled to the communication device includes a server device, a further-switching unit, a network-address-determining unit, a log-on unit, and a log-off unit. The terminal has therein been assigned the directory number via which it can be logically addressed for a connection. The terminal has furthermore been assigned the first hardware address via which it can be addressed in the network. The communication device has been assigned the second hardware address via which it can be addressed in the network. The server device serves to call up a further-switching unit assigned to additional information as the result of an incoming partial connection addressed via the directory number and depending on the additional information conveyed. The communication device further includes the further-switching unit assigned to additional information for determining the first hardware address of the called terminal and for further switching the partial connection to the terminal using the first hardware address that has been determined. The network-address-determining unit serves to assign the second hardware address to a network address and/or to interrogate the network address. The log-on unit serves to convey the directory number, the network address, and additional information controlling the communication device in a registration message to the connection controller as part of the process of activating the communication device. The log-off unit further serves to convey the directory number and/or network address and the additional information in a deregistration message to the connection controller as part of the process of deactivating the communication device.

The inventive terminal, which is coupled to a connection controller via a packet-oriented network and to a communication device (for example directly or via intermediately connected network elements), includes a detection unit, a log-on unit, and a log-off unit. The terminal has been assigned the directory number via which it can be logically addressed for a connection. The terminal has further been assigned the first hardware address via which it can be addressed in the network, with the hardware address being assigned the first network address and the terminal being controllable via additional information. The detection unit serves to detect activating and/or deactivating of the communication device from an incoming message from the communication device or from the reception or absence of data-transport messages from the communication device. The log-on unit serves to convey the network address and additional information controlling the terminal in a registration message to the connection controller depending on deactivating of the communication device being detected, whereas the log-off unit serves to convey the network address and the additional information in a deregistration message to a connection controller depending on activating of the communication device being detected.

In an advantageous embodiment of the invention the communication device and the terminal are contained in the same communication unit, in particular in the form of software components on a PC. There already being a PC at customary workstations today, the method can thus be implemented without the use of additional components and/or devices.

Further advantageous developments of the invention include procedural steps for deactivating the communication device, in particular switching it off, and for activating the deactivated communication device, in particular switching it on, with it being a shared feature of said embodiments that no additional network address is used and assigned to a hardware address, or, if so, then only for a brief period.

Further advantageous embodiments of the invention include procedural steps during which preferably a feature of the connection controller or of a possibly present communication-switching system is used, in the case of which feature a terminal can be assigned a plurality of directory numbers and/or a plurality of terminals can be assigned a common directory number. A feature of said type is referred to also as "Multiple Line Appearances" and its use advantageously supports activating and/or deactivating the communication device with the terminal's remaining permanently available.

In a further advantageous embodiment of the invention an address server, in particular a DHCP server, is provided for administering and allocating network addresses. This is advantageous to the extent that the same network address can, if required, always be assigned to a device in the active condition and that, if an assignment of a network address to a hardware address is canceled, said network address can be released by the address server for use by other computers or terminals.

What is advantageous about the cited inventive method and devices is that the terminal remains permanently accessible. This is frequently referred to as "always on". The terminal will thus be accessible, in particular for voice communication, even when the PC located at a workstation and having the communication device is switched off.

It is further advantageous that connections can be shared and/or forwarded to other applications in the communication device, thus allowing expanded applications to be formed as part of realtime communication such as, for example, application sharing, multimedia conferencing, and instant messaging applications through interoperation of a PC application with the inventive terminal.

BRIEF DESCRIPTION OF THE DRAWINGS

Exemplary embodiments of the invention are explained in more detail below with the aid of the drawings.

DETAILED DESCRIPTION OF INVENTION

Figure 1:
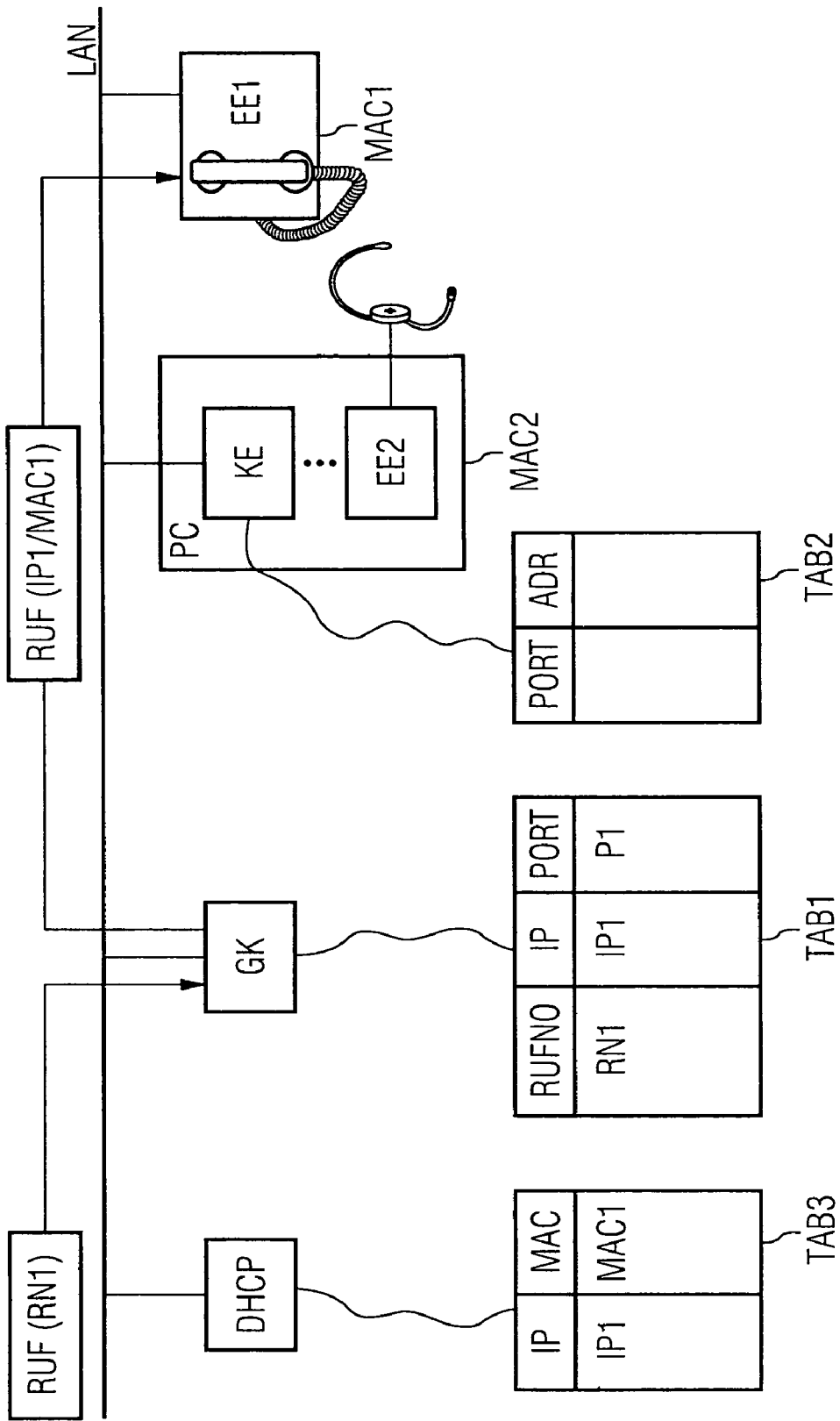
FIG. 1 is a schematic diagram of the prior art that illustrates an instance of setting up a connection.

FIGS. 1 to 13 are schematics of a communication system having a communication device KE, a gatekeeper GK as the connection controller, a first terminal EE1, a second terminal EE2, and a DHCP server DHCP as the address server. The first terminal EE1 is therein, for example, an IP telephone and the second terminal EE2 a telephone application, referred to also as a softclient. The communication device KE and second terminal EE2 are, in the present exemplary embodiments, software and/or hardware components of a computer PC. The computer PC and first terminal EE1 are preferably located in the same room or together at a user's workstation.

The first terminal EE1 is in particular controlled via what is termed a telephony-stimulus protocol by the gatekeeper GK or a communication-switching system (not shown) present in the communication system. What is advantageous therein is that the telephony-stimulus protocol relocates controlling of the first terminal EE1 to the gatekeeper GK and/or communication-switching system.

The gatekeeper GK, the first terminal EE1, and the DHCP server DHCP are coupled via a packet-oriented network, preferably a company's or organization's Internet-Protocol-based local area network LAN. In FIGS. 1-6 and 8-13 the communication device KE is furthermore coupled to the local area network LAN, while, representing an alternative embodiment, FIG. 7 is a schematic of a coupling of the communication device KE to the first terminal EE1 via an IP switch S preferably contained in the first terminal EE1, with said IP switch S forwarding packets arriving on the LAN side to the first terminal EE1 and communication device KE.

Also shown schematically in FIGS. 1-13 are configuration tables that are contained in the cited components and relevant to the present exemplary embodiments, with a tabular implementation being only one possibility among several alternative methods for assigning values.

A gatekeeper table TAB1 is read from and written to by the gatekeeper GK and stores an assignment of directory numbers RUFNO to IP addresses IP as the network addresses and of network ports PORT as additional information. The DHCP server reads from and writes to a DHCP table TAB3 and stores therein an assignment of the IP addresses IP to hardware addresses MAC (in the present exemplary embodiment what are termed MAC addresses). Network elements, in particular the gatekeeper GK, in the local area network LAN are furthermore informed about said assignment via what is termed the ARP protocol (ARP: Address Resolution Protocol) so that IP addresses can be resolved into MAC addresses in the relevant network element.

The storage location of the respective tables may in various implementations of the method depart from the schematic presentation shown in the Figures. The gatekeeper GK can, for instance, call up the assignment of the values in the gatekeeper table TAB1 from another component in the network, for example from a data server or circuit-oriented communication-switching system.

As an alternative to the implementation by means of network ports the additional information can be, for example, the protocol employed, so that in particular incoming RTP packets of a voice connection are forwarded to the first terminal EE1 independently of an addressed network port and an SMTP connection, for example, is able meanwhile to be routed to an e-mail application. The additional information can, moreover, be further information from among that conveyed in the course of a connection setup.

Ranges of valid network ports can furthermore also be indicated as network ports in the tables shown in the Figures.

The communication device KE administers an assignment of network ports PORT to addresses ADR of terminals coupled thereto via the local area network LAN or directly. Said addresses ADR can be MAC addresses of terminals, tupels formed from MAC addresses and network ports (what are termed sockets or communication endpoints), or vector addresses or process numbers of terminals or applications running as software components on the computer PC. It is assumed in the present exemplary embodiments that the second terminal EE2 is embodied as a software component and that the communication device KE can address said second terminal EE2 with a vector address EE2A and communicate therewith via it.

Packet-switched connections, in particular voice connections, can in the present exemplary embodiments be addressed, depending on the protocol employed and/or the layer in the OSI Reference Model of the protocol employed, using a directory number, an IP address, and/or a MAC address. In the case of MAC addressing the first terminal EE1 is therein addressed via a first MAC address MAC1 as the first hardware address in the network. The computer PC and communication device KE are addressed via a second MAC address MAC2 as the second hardware address in the network. Let said respective MAC addresses MAC1, MAC2 have therein been permanently and immutably assigned to the first terminal EE1 and the computer PC—and hence also to the communication device KE—or to their network components.

Also shown schematically in FIGS. 8-13 is a second gatekeeper table TAB4 that administers an assignment between a main directory number RUFNO and subsidiary directory number RUFNOS as part of a "Multiple Line Appearances" feature (Multiple Line Appearances: Multiple lines and multiple directory numbers that can be assigned to one device; a call can be signaled to several terminals and/or one device can be accessed via several directory numbers).

FIG. 1 represents the prior art and illustrates an instance of setting up a connection RUF, in particular a voice or multimedia connection, initiated by a calling communication partner (not shown). Said partner is, for example, an IP terminal or IP gateway in a communication-switching system. In the operating condition shown, which, incidentally, can also be assumed within the scope of the invention, the computer PC, the communication device KE contained therein, and the second terminal EE2 are inactive. It is furthermore assumed that the calling communication partner wishes to set up the connection RUF to the first terminal EE1. It is further assumed that the first terminal EE1 is active and accessible. Let the first terminal have been assigned a directory number RN1 via which it can be logically addressed for the connection RUF. The connection RUF is addressed via the directory number RN1 which is conveyed as the parameter in a connection-setup message. Said connection-setup message is routed to the gatekeeper GK.

For the received directory number RN1 the gatekeeper GK determines from the gatekeeper table TAB1 the dynamically assigned first IP address IP1 and the first network port P1 via both of which the first terminal EE1 can accept incoming connections. The connection setup to the first terminal EE1 is thereupon initiated by means of the first IP address IP1, with addressing taking place from the gatekeeper GK to the first terminal EE1 with the aid of the first IP address IP1. The first IP address IP1 is converted in the gatekeeper GK, or in a network element (not shown) located in the transmission path, into the first MAC address MAC1 based on the configuration in the DHCP server DHCP in which, in the DHCP table TAB3, the first IP address IP1 has been assigned to the first MAC address MAC1. This information is used for addressing of the connection RUF at least from a network element or the gatekeeper GK via the first MAC address MAC1. The connection reaches the first terminal EE1 via the first MAC address MAC1 and the first network port P1 that has been determined. The first terminal EE1 can thereafter accept the connection and useful-data communication will be possible between the calling communication partner and the first terminal EE1.

Figure 2:
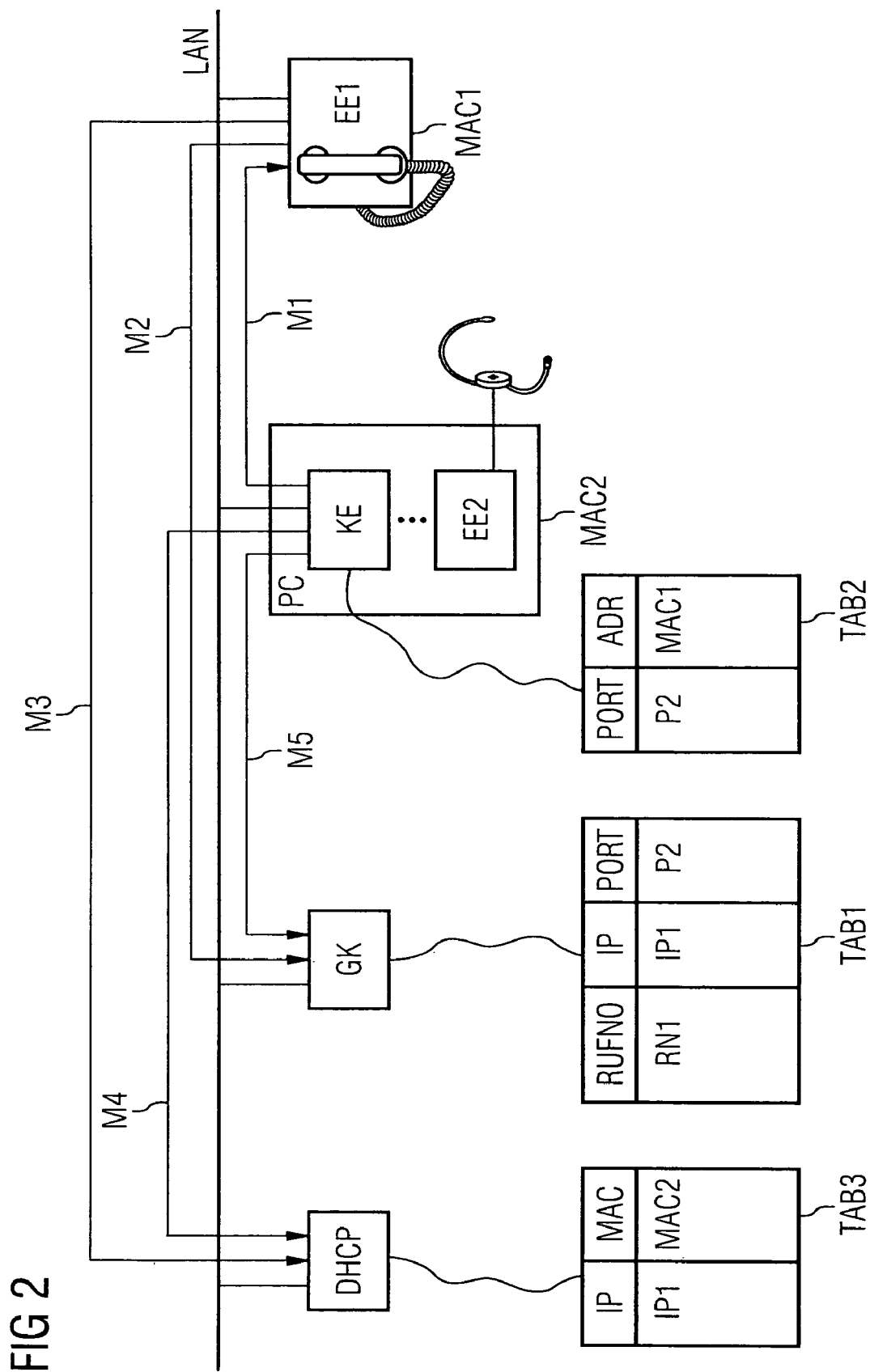
FIG. 2 is an exemplary schematic diagram of an activation of the communication device in accordance with the present invention.

FIG. 2 illustrates an inventive communication system with activation of the computer PC. Activating of the computer PC and hence of the communication device KE results in a message M1 being sent to the first terminal EE1 informing it that the computer PC will henceforth be activated. This is possible because the first terminal EE1 has been made known to the communication device KE. A polling method proceeding from the first terminal EE1 is an alternative or additional possibility. The first terminal EE1 thereupon sends a log-off message M2 to the gatekeeper GK for releasing the directory number RN1 as well as a log-off message M3 to the DHCP server DHCP for releasing the first IP address IP1. The gatekeeper GK and DHCP server DHCP update the respective gatekeeper table TAB1 and DHCP table TAB3 preferably by deleting entries for the IP address IP1. The messages M2 and M3 include therein preferably the IP address IP1 as the parameter.

Thereupon or later (for example delayed by a timer or by a notification (not shown) from the first terminal EE1), in an initializing phase the computer PC sends a broadcast message (not shown) with its second MAC address MAC2 in order to notify the DHCP server DHCP. Given the appropriate configuration the DHCP server DHCP will thereupon offer the computer PC the first IP address IP1 (not shown) and the computer PC will accept this by means of the message M4 to the DHCP server DHCP for assigning the first IP address IP1 to the second MAC address MAC2. The DHCP server DHCP thereupon enters the assignment of the first IP address IP1 to the second MAC address MAC2 in the DHCP table TAB3. This is furthermore notified to the network elements involved in the network (not shown). Thereupon or in parallel therewith the communication device KE logs on to the gatekeeper GK by means of a message M5 with the first IP address IP1, a second network port P2 as additional information, and the directory number RN1 as the parameter. The gatekeeper GK thereupon enters the assignment of the directory number RN1 to the first IP address IP1 and to the network port P2 in the gatekeeper table TAB1 and stores this in the gatekeeper GK. The second network port P2 is therein a valid computer PC network port controlling the communication device KE, from which port it can be recognized for which of the computer's applications an incoming communication is intended.

The communication device KE furthermore stores the fact that a connection is to be set up to the first terminal EE1 in the case of incoming connections to the second network port P2, with the first terminal EE1 being addressed via its MAC address MAC1. Said assignment of the second network port P2 to the first MAC address MAC1 is shown in FIG. 2 as a communication-setup table TAB2. This can, however, also be implemented as a simple "if-then" logic or with the aid of a branch table.

On completion of the cited inventive procedural steps only a single IP address, namely the first IP address IP1, will be assigned jointly for the computer PC and the first terminal EE1. A call setup using only this single IP address is shown in FIG. 3 proceeding from a configuration as described above.

Figure 3:
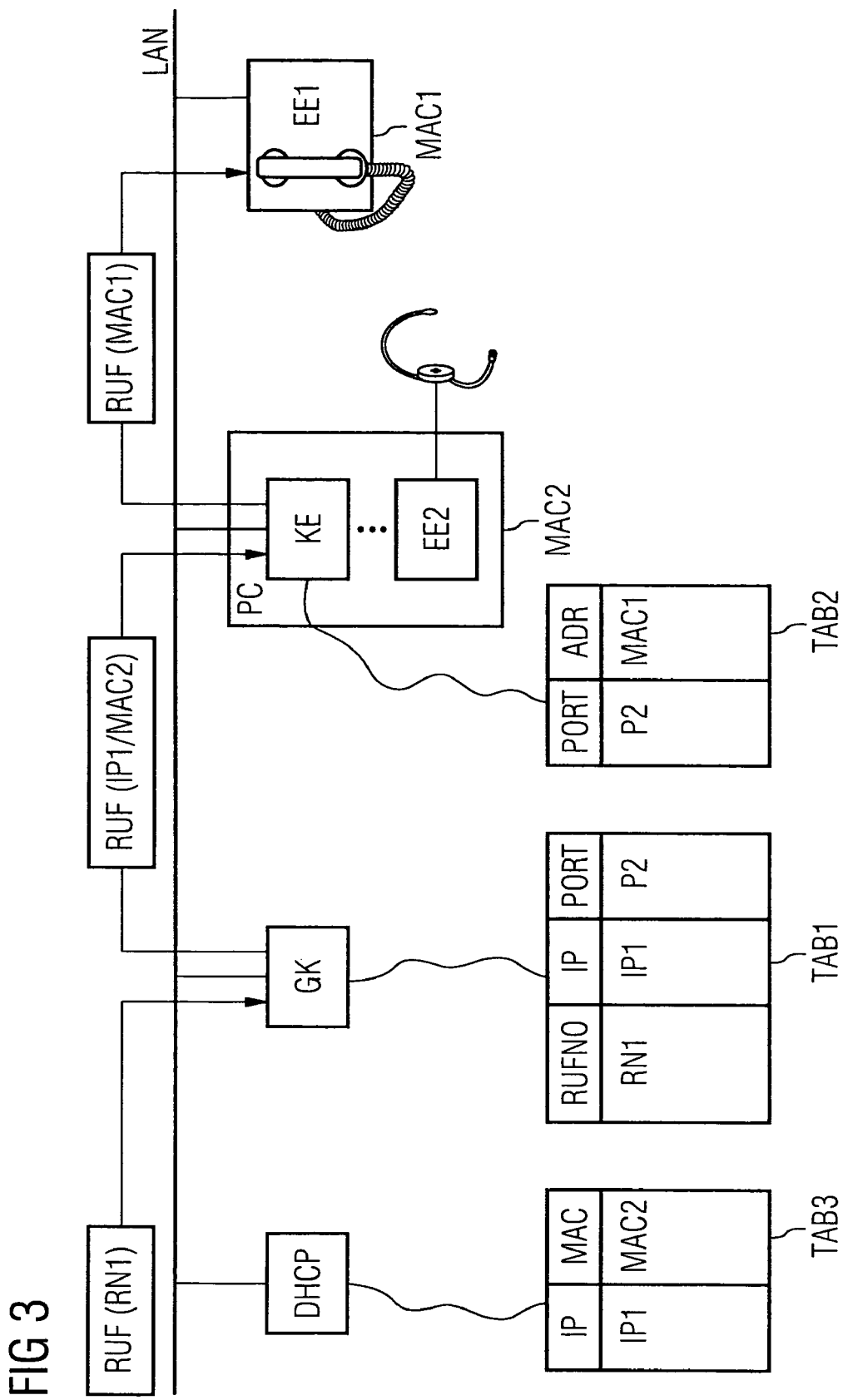
FIG. 3 is an exemplary schematic diagram of a forwarded connection via the activated communication device in accordance with the present invention.

FIG. 3 shows an inventive setup of the connection RUF initiated by a calling communication partner (not shown), with the connection RUF being inventively forwarded to the first terminal EE1 via the activated communication device KE. The connection RUF, addressed via the directory number RN1, to the called first terminal EE1 is set up from the calling communication partner to the gatekeeper GK. For the received directory number RN1 the gatekeeper GK determines from the gatekeeper table TAB1 the first IP address IP1 assigned to the directory number RN1 and the second network port P2 assigned to the directory number RN1. The connection setup is consequently signaled to the communication device KE by means of the first IP address IP1, with addressing taking place from the gatekeeper GK to the communication device KE with the aid of the first IP address IP1. The first IP address IP1 is converted in the gatekeeper GK, or in one of the network elements (not shown) located in the transmission path, to the second MAC address MAC2 assigned thereto based on the configuration in the DHCP server DHCP in which, in the DHCP table TAB3, the first IP address IP1 has been assigned to the second MAC address MAC2.

This information is used for addressing for setting up a partial connection to the communication device KE as part of the connection RUF at least from one of the network elements or the gatekeeper GK via the second MAC address MAC2. The partial connection is set up to the determined second network port P2 of the communication device KE by means of the second MAC address MAC2 and the second network port P2. Said kind of setting up of a partial connection to a network port can therein also be regarded as conveying the network port as part of the partial connection.

As a result of this incoming partial connection the communication device KE inventively determines the first MAC address MAC1 of the first terminal EE1 via the communication-setup table TAB2 depending on the second network port P2 and sets up the connection RUF by addressing via the first MAC address MAC1. The first terminal EE1 can thereupon accept this further-switched connection and switch through a signaling connection and/or useful-data communication between the calling communication partner and the first terminal EE1. The calling communication partner and first terminal EE1 can thus exchange data, with any data to and/or from the first terminal EE1 being forwarded via the communication device KE according to the above procedural steps.

For useful-data communication the useful-data stream, for example an RTP data stream in systems customary today (RTP: Real Time Protocol), is switched through by the communication device KE to the first terminal EE1.

In an advantageous development a network port can additionally be stored in the communication-setup table TAB2 for more specific addressing of the first terminal EE1. This is advantageous to the extent that various services of the first terminal EE1, for example an FTP service for installing software versions of the terminal, an HTTP service for configuring the terminal, or a communication service for voice communication, can be directly addressed thereby.

Figure 4:
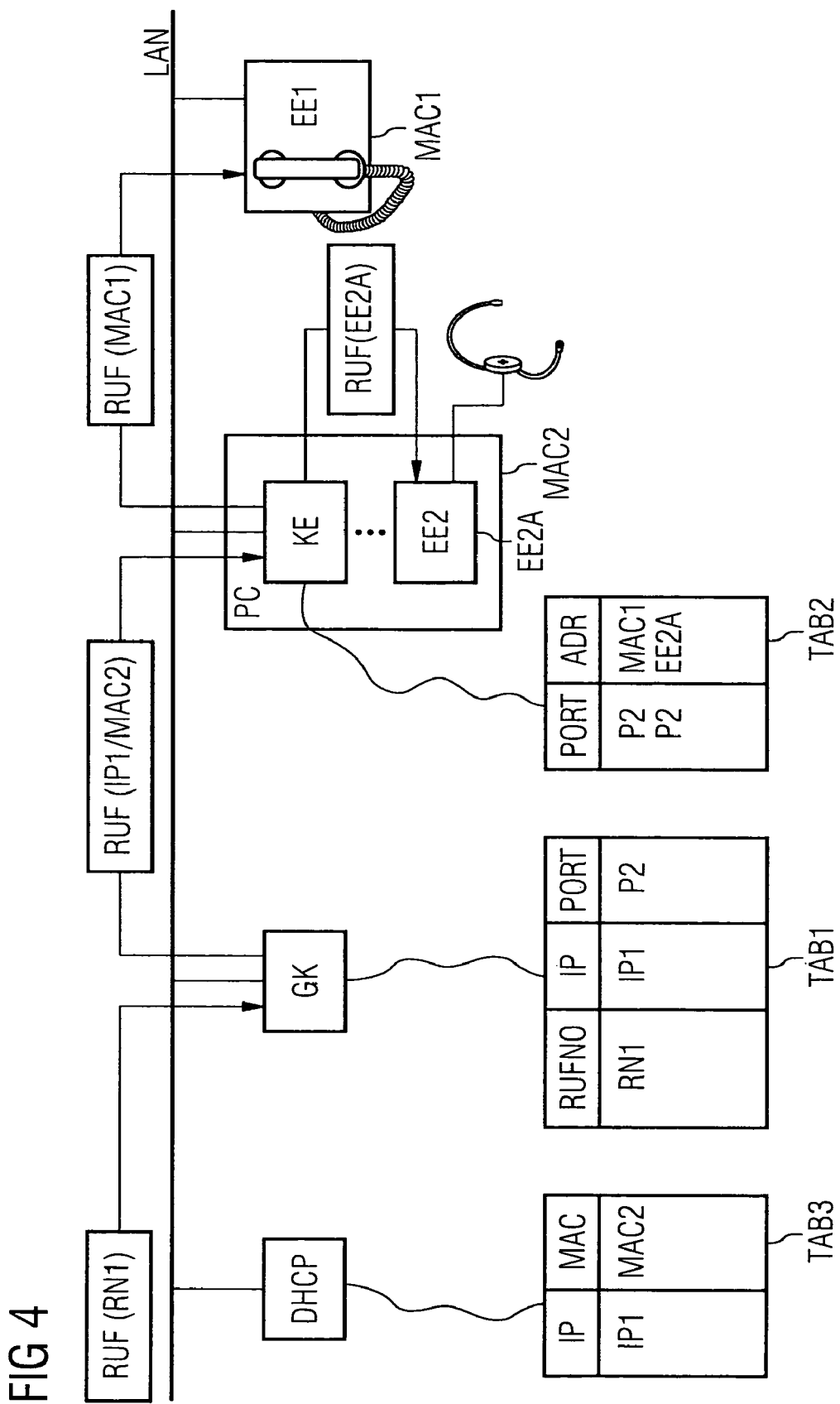
FIG. 4 is an exemplary schematic diagram of a forwarded connection via the activated communication device in accordance with another embodiment of the present invention.
Figure 5:
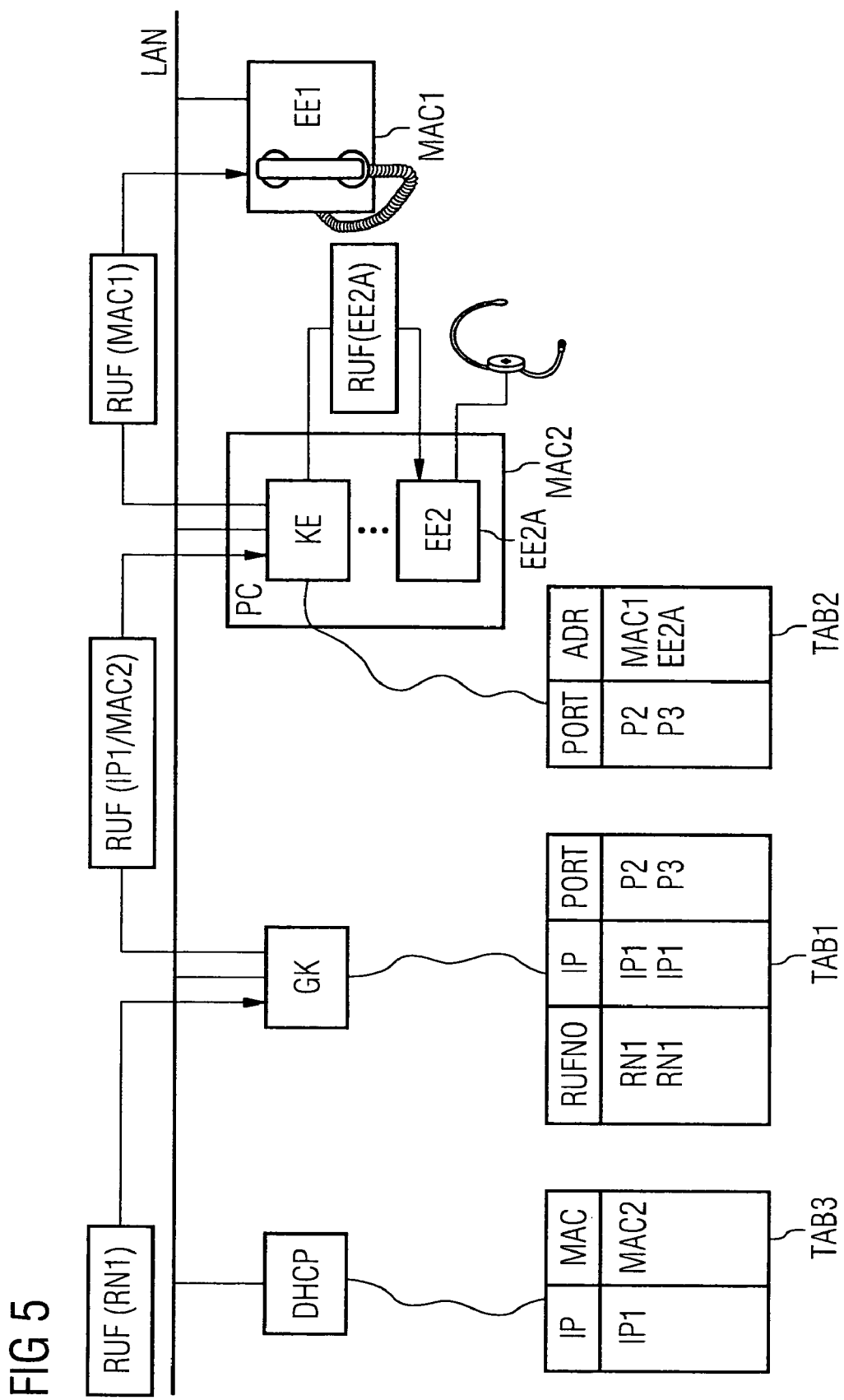
FIG. 5 is an exemplary schematic diagram of a forwarded connection via the activated communication device in accordance with yet another embodiment the present invention.

Shown schematically in FIGS. 4 and 5 are the configuration tables and connection setup for when the second terminal EE2 has been set up on the computer PC and activated.

The only difference between FIG. 4 and FIG. 3 is that the communication-setup table TAB2 contains an additional entry for the network port P2 referring to the vector address EE2A of the second terminal EE2. The connection is set up analogously to FIG. 3, with the communication device KE additionally initiating a connection to the respective terminal for each entry in the communication-setup table TAB2 on receiving the connection RUF from the gatekeeper GK. For assignment of the network port P2 to the first MAC address MAC1 the connection RUF can thus be set up to the first terminal EE1 by means of addressing via this first MAC address MAC1. For assignment of the network port P2 to the vector address EE2A the connection RUF is additionally set up to the second terminal EE2 by means of computer-internal addressing to said vector address EE2A.

A user of the terminals can thereupon be notified of an incoming call by means of, for example, acoustic or optical signals. The useful-data connection will particularly then be switched through to the respective terminal, depending on which of the two terminals EE1, EE2 accepts the connection in an ensuing step (not shown).

If the connection is accepted by the second terminal EE2, the useful-data stream, for example an RTP data stream, will be switched through for useful-data communication to said terminal by the communication device KE to the audio unit, in particular to a sound card having a microphone and headset, of the computer PC.

FIG. 5 illustrates a corresponding connection setup analogous to FIG. 4 having a configuration in the gatekeeper table TAB1 and communication-setup table TAB2 that is different from FIG. 4. The gatekeeper table TAB1 contains a second entry for the directory number RN1, with said directory number being assigned the first IP address IP1 and a third network port P3. The third network port P3 is furthermore assigned the vector address EE2A in the communication-setup table TAB2. The connection will then be set up to the two terminals EE1, EE2 analogously to previously described procedural steps.

Figure 6:
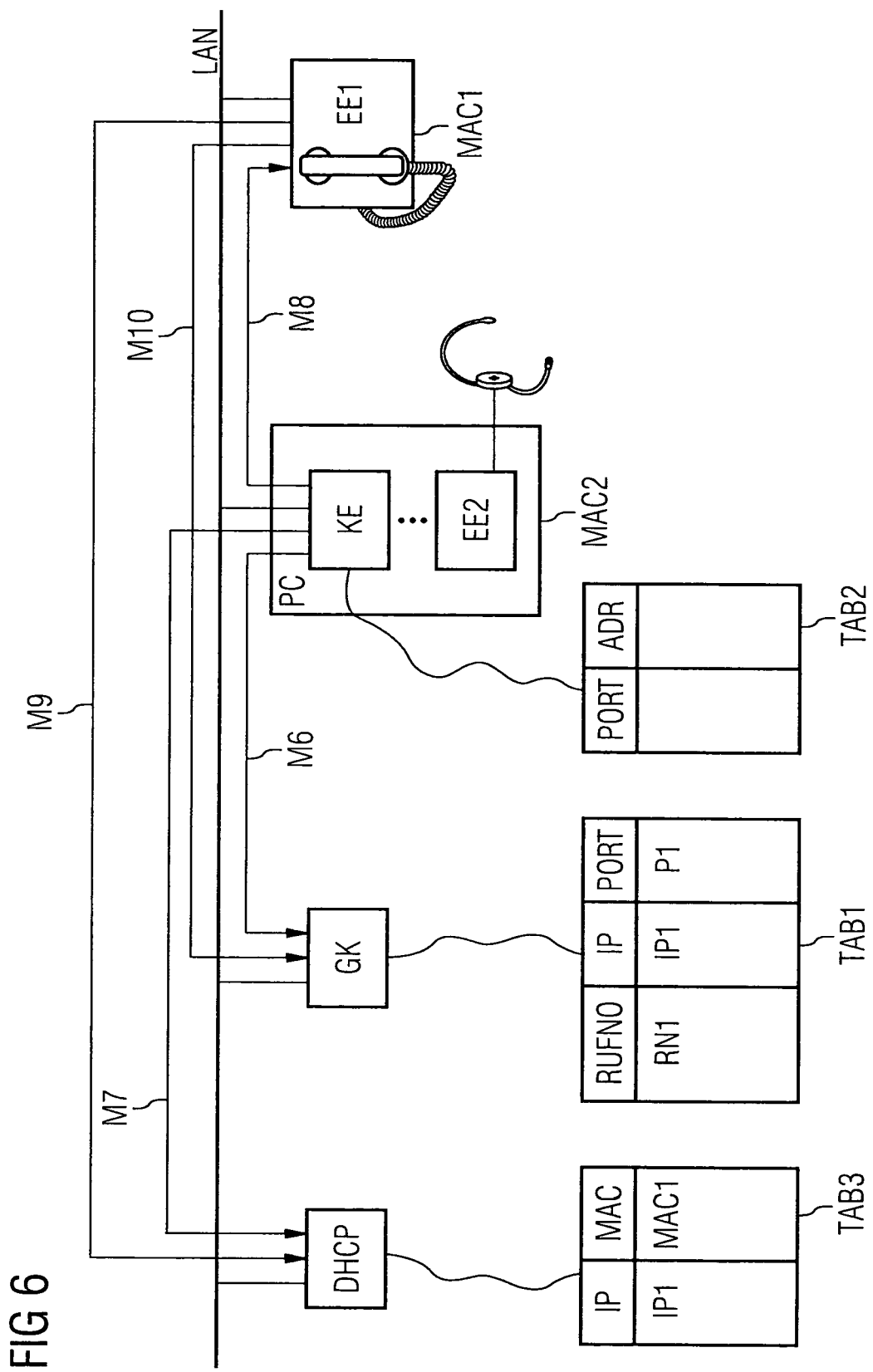
FIG. 6 is an exemplary schematic diagram of a deactivating of the communication device in accordance with the present invention.
Figure 7:
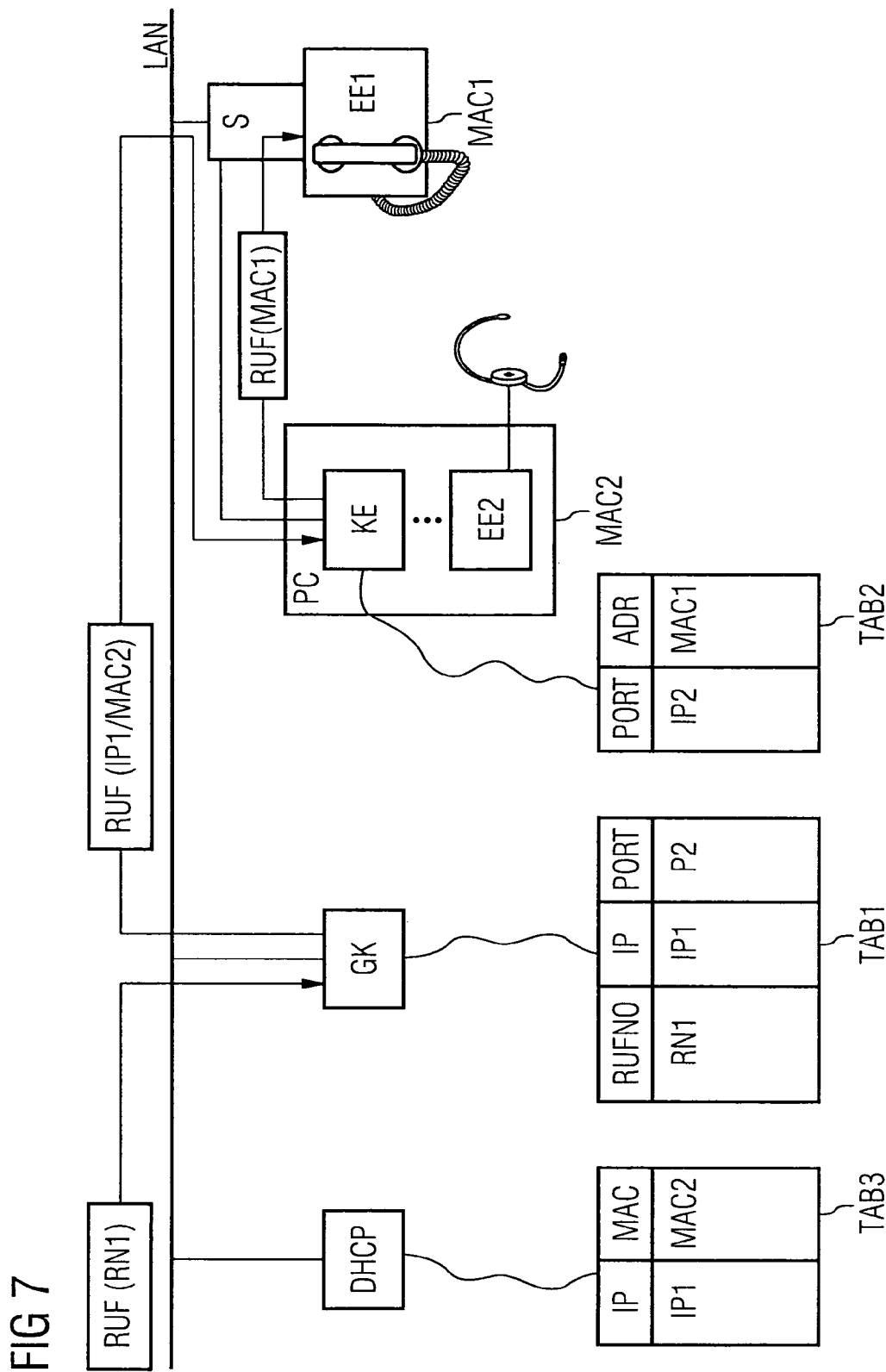
FIG. 7 is an exemplary schematic diagram of a coupling of the communication device via an IP switch contained in the first terminal in accordance with the present invention.

Proceeding from the configuration shown in FIG. 3, FIG. 6 illustrates a deactivating of the computer PC and of the communication device KE. In a first deactivation step the communication device KE sends a log-off message M6 to the gatekeeper GK having preferably the first IP address IP1 as the parameter. The gatekeeper GK thereupon deletes the associated entry in the gatekeeper table TAB1, thereby releasing the directory number RN1 indicated in the entry. The computer PC furthermore sends a log-off message M7 to the DHCP server DHCP for deleting the entry for the first IP address IP1 in the DHCP table TAB3 and hence for releasing the first IP address IP1.

On receiving a confirmation (not shown) from the DHCP server, the communication device KE informs the first terminal EE1 about the process of deactivating the computer PC by means of the message M8. The first terminal EE1 alternatively detects deactivating of the computer PC from the absence of a repeated polling message (not shown). The first terminal EE1 thereupon logs on to the DHCP server DHCP. This is shown schematically by the log-on message M9, with said logging-on possibly including the exchange of a plurality of customary messages such as "DHCP-Discover" to the DHCP server, its response with "DHCP-Offer", thereupon the response "DHCP-Request" to the DHCP server, and its response "DHCP-Acknowledge", including the first IP address IP1 as the parameter.

Let it be assumed that the DHCP server thereupon logically assigns the first terminal EE1 the first IP address IP1, thereby assigning the first IP address IP1 to the first MAC address MAC1. After logging on to the DHCP server DHCP, the first terminal EE1 logs on to the gatekeeper GK by means of the log-on message M10. Preferably the first IP address IP1 and the first network port P1 as the parameter are conveyed in said log-on message M10 when this is done. The gatekeeper GK thereupon stores an assignment of the directory number RN1 to the first IP address IP1 and to the first network port P1 in the gatekeeper table TAB1. The first network port P1 is therein additional information controlling the first terminal EE1 via which the first terminal EE1 can implement incoming and/or outgoing connections. The value of the first network port P1 must not therein perforce be the same as in preceding procedural steps.

The system status illustrated by FIG. 1 will hence be reestablished when the computer PC has been deactivated. Only a single IP address has been reserved in the system and incoming connections will be switched through to the first terminal EE1, bypassing the inactive computer PC. The inventive method is thus compatible with existing methods' connection setup and can easily be integrated in existing communication systems.

FIG. 7 is a schematic of a coupling of the communication device KE via an IP switch S contained in the first terminal EE1. The computer PC is active and connected to said IP switch S. There is no direct link between the computer PC and the local area network LAN, or such a link is not used for the connection. The values in the configuration tables correspond to those in FIG. 3.

For an incoming connection RUF, as in FIG. 3 the first IP address IP1 and second network port P2 are determined for the directory number RN1 in the gatekeeper GK. Addressing of the connection RUF from the gatekeeper GK to the computer PC takes place via the first IP address IP1 or via the assigned second MAC address MAC2 of the computer PC. The connection RUF is set up from the gatekeeper GK via the IP switch S to the communication device KE. The first MAC address MAC1 of the first terminal EE1 is determined there from the second network port P2 as being the destination of the connection RUF. The communication device KE thereupon sets up a connection RUF to the IP switch S and addresses the first terminal EE1 having the first MAC address MAC1. The connection RUF is thereupon forwarded in the IP switch S to the first terminal EE1 based on the first MAC address MAC1.

Coupling of the communication device KE to the first terminal EE1 via a switch S is advantageous to the extent that the switch S is able to detect activating and/or deactivating of the communication device KE based on what is termed a "link up" and/or "link down" at the switch output to the communication device KE or to the computer PC. These are in particular changes (for example setup and/or cleardown) in the connection's Transport Layer. The switch S can inform the first terminal EE1 of having detected a "link up" and/or "link down" of said type so that said terminal can initiate procedural steps requiring to be performed by it as part of activating and/or deactivating.

What is particularly advantageous about the procedural steps described hitherto is that only one IP address, namely the first IP address IP1, is used in all procedural steps, whereas otherwise, without the inventive method, two IP addresses are usually reserved. It is further advantageous that the computer PC and/or first terminal EE1 can in each case be assigned the same IP address by the DHCP server DHCP when the computer PC is activated repeatedly. It is thus unnecessary to update static configurations in other network elements or applications alongside the configurations shown in the procedural steps.

FIGS. 8-13 explained below illustrate procedural steps and configurations when the "Multiple Line Appearances" feature is used.

Figure 8:
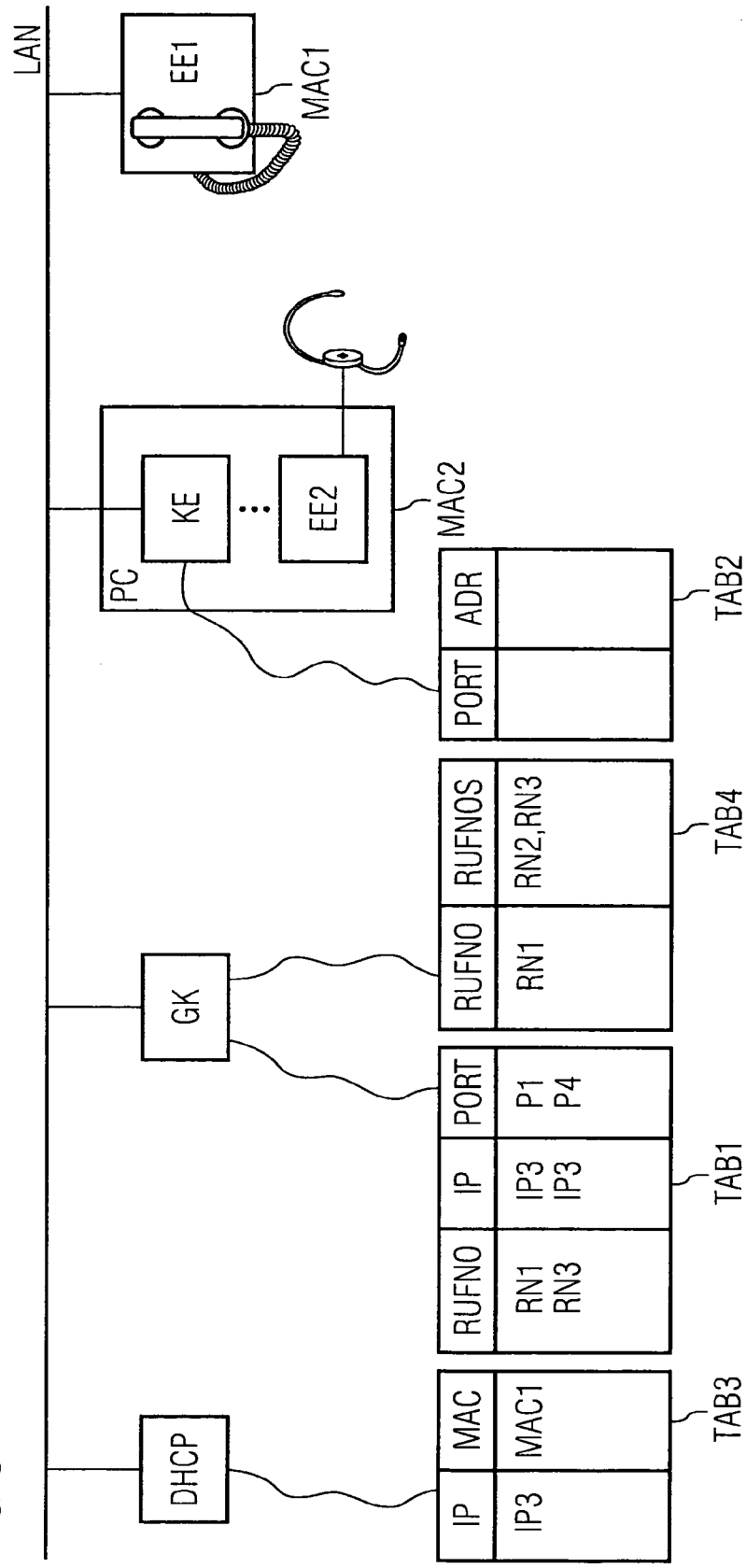
FIG. 8 is an exemplary schematic diagram of a configuration of when the "Multiple Line Appearances" feature is used in accordance with the present invention.

FIG. 8 therein illustrates a basic configuration of the inventive method when the "Multiple Line Appearances" feature is used, with the prerequisite that the computer PC has been deactivated. The DHCP table TAB3 therein stores the assignment of a third IP address IP3 to the first MAC address MAC1 of the first terminal EE1.

The directory number RN1 has been assigned the third IP address IP3 and the first network port P1 in the gatekeeper table TAB1 by the "Multiple Line Appearances" feature. A third directory number RN3 has furthermore been assigned the third IP address IP3 and a fourth network port P4. The first and fourth network port P1, P4 are therein valid ports at which the terminal EE1 can accept connections, with its being possible for values of said network ports P1, P4 to be identical. In a multi-line table TAB4 the gatekeeper GK furthermore stores an assignment of the directory number RN1 to a second directory number RN2 and the third directory number RN3. The effect of said assignment is that incoming connections to the second or third directory number RN2, RN3 will be treated as though having been addressed to the directory number RN1. Thus in keeping with the "Multiple Line Appearances" feature a connection addressed to the second directory number RN2 can be switched to the terminal that has been assigned the directory number RN1.

An inventive connection setup in a system having the above-cited configuration would be switched through to the first terminal EE1 in the event of addressing with the directory number RN1 or the third directory number RN3 because both directory numbers have been assigned the third IP address IP3 in the gatekeeper GK and the third IP address IP3 has been assigned the first MAC address MAC1 of the first terminal EE1 in the DHCP server DHCP.

Figure 9:
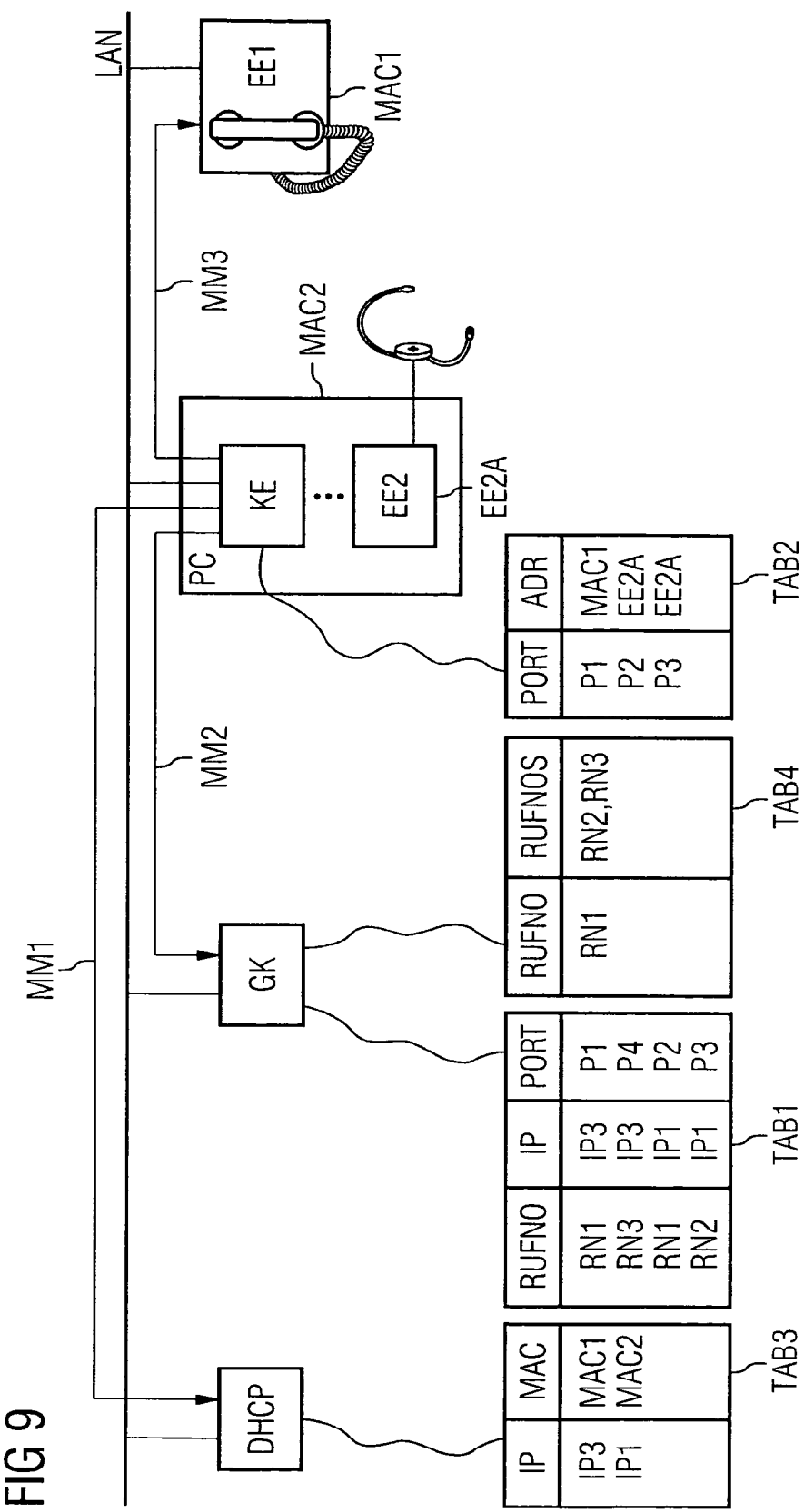
FIG. 9 is another exemplary schematic diagram of a configuration of when the "Multiple Line Appearances" feature is used in accordance with the present invention.

Proceeding from this configuration, FIG. 9 schematically illustrates which messages are exchanged when the computer PC, and hence the communication device KE, and which entries will result therefrom in the configuration tables TAB1, TAB2, TAB3, TAB4.

As soon as activation of the computer PC is initiated it logs on to the DHCP server DHCP by means of the log-on message MM1. The DHCP server DHCP reserves the first IP address IP1, assigns it the second MAC address MAC2 of the computer PC, and stores said assignment in the DHCP table TAB3. This means that two IP addresses are temporarily reserved in the communication system for the computer PC and first terminal EE1. When the DHCP server DHCP has responded, the communication device KE logs on to the gatekeeper GK with the log-on message MM2. Said gatekeeper GK generates an assignment of the directory number RN1 to the first IP address IP1 and second network port P2 and an assignment of the second directory number RN2 to the first IP address IP1 and a third network port P3. Said assignment is stored in the gatekeeper table TAB3. The communication device KE furthermore assigns the first MAC address MAC1 to the first network port P1, the vector address EE2A to the second network port P2, and the vector address EE2A to the third network port P3, then stores said assignment in the communication-setup table TAB2. The communication device KE further informs the first terminal EE1 by means of a message MM3 that the computer PC has been activated.

The steps of activating the computer PC have still not been finalized. Other procedural steps are explained further below with the aid of FIG. 11.

It is particularly advantageous that at any time during the procedural flow the connection can be set up to at least one of the two terminals EE1, EE2. This is illustrated by FIG. 10.

Figure 10:
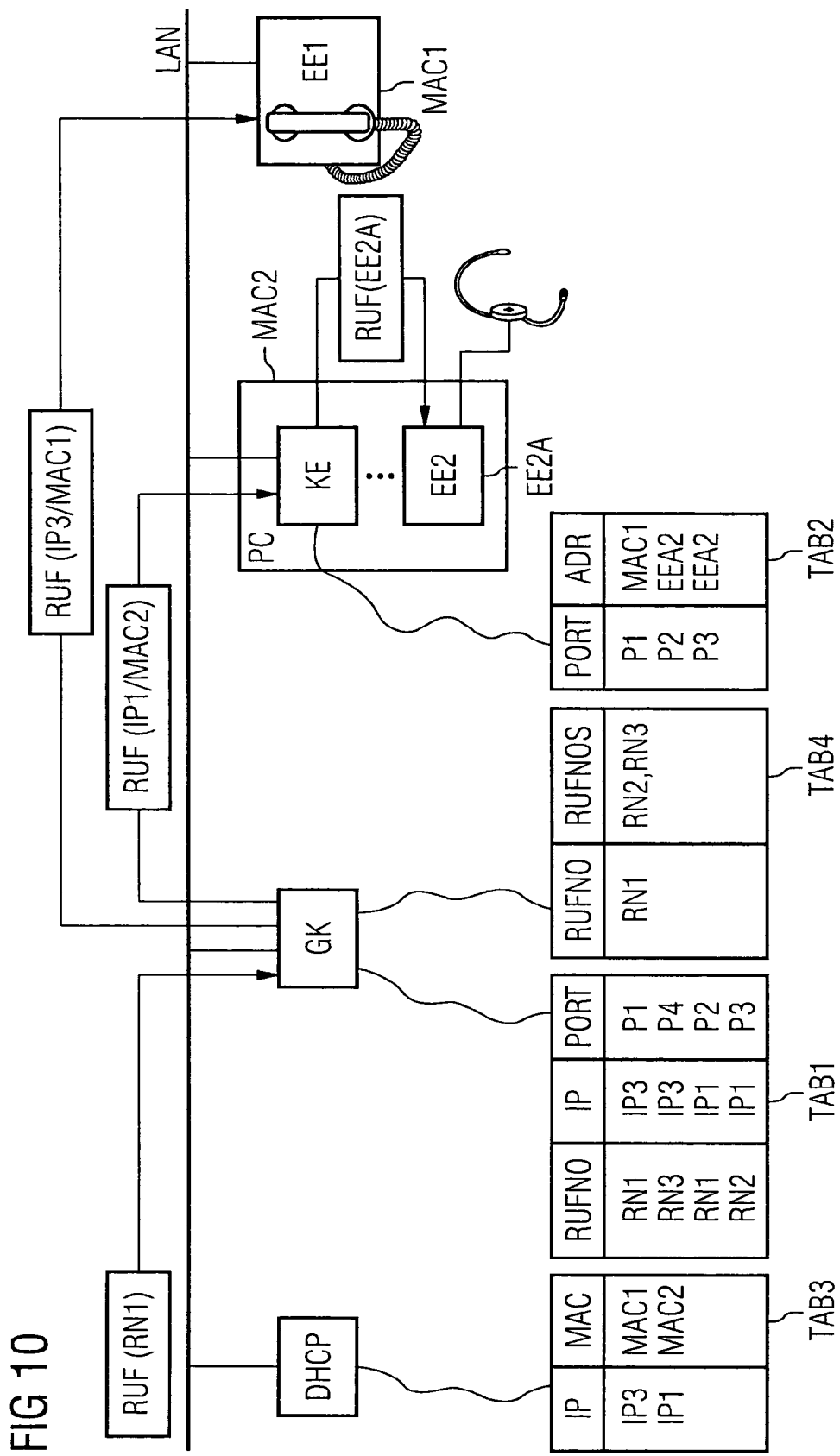
FIG. 10 is another exemplary schematic diagram of a configuration of when the "Multiple Line Appearances" feature is used in accordance with the present invention.

FIG. 10 illustrates the connection setup after the message MM3 has been sent. Further steps involved in activating the computer PC are shown in FIG. 11.

The incoming connection RUF is addressed in FIG. 10 with the directory number RN1 and is routed to the gatekeeper GK. Based on the two entries for the directory number RN1 in the gatekeeper table TAB1, the gatekeeper GK there determines the third IP address IP3 with the network port P1 and the first IP address IP1 with the second hardware port P2 as being destination sockets for the connection RUF. The gatekeeper GK sets up the connection RUF in each case to the cited pairs of IP address network ports by means of addressing via the IP addresses IP1, IP3, with the connection RUF being set up to the first terminal EE1 with the third IP address IP3 or the allocated first MAC address MAC1. The connection RUF is further set up to the communication device KE with the first IP address IP1 or the assigned second MAC address MAC2 and thence to the second terminal EE2 by means of evaluating the communication-setup table TAB2.

Figure 11:
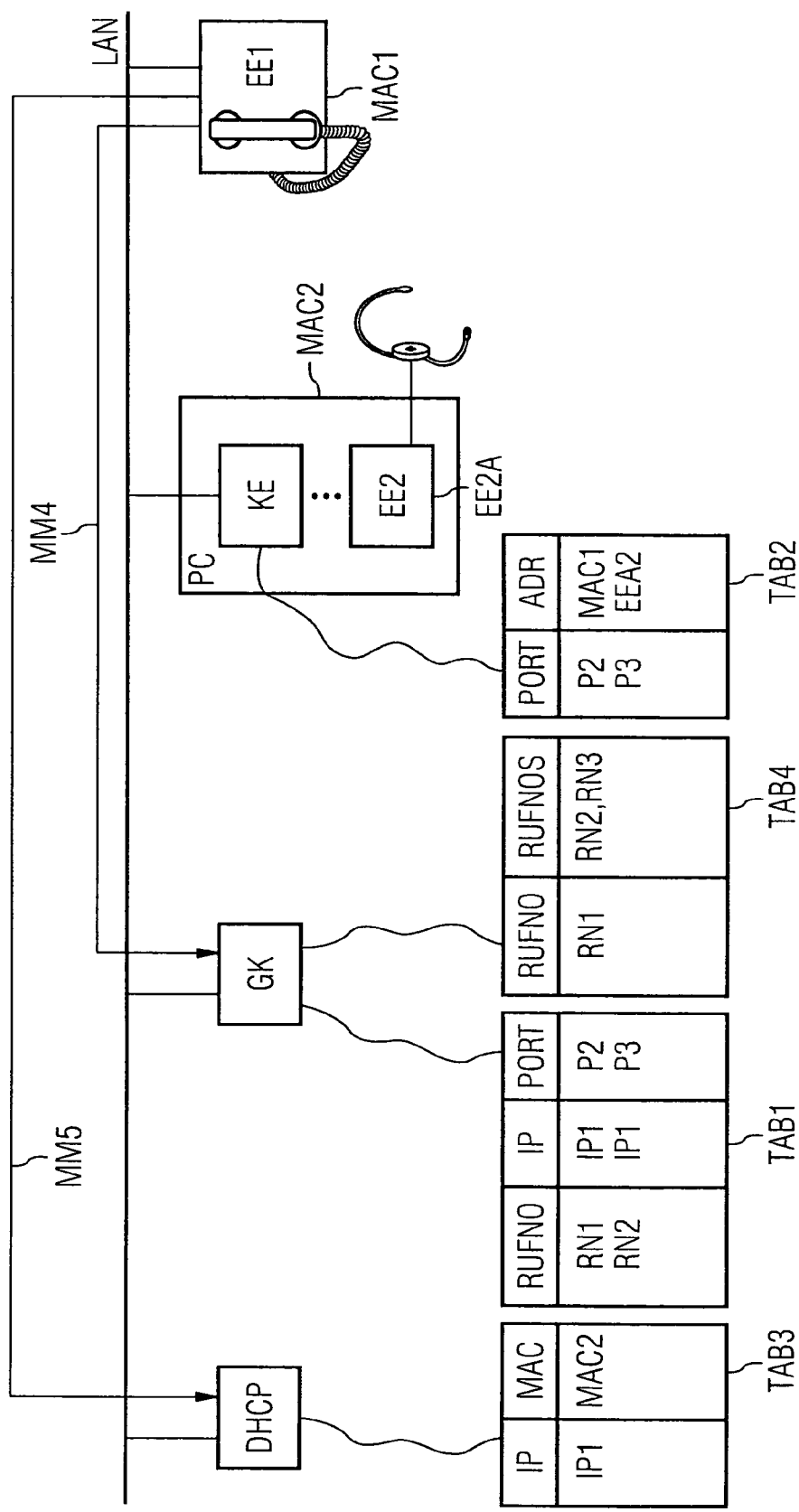
FIG. 11 is another exemplary schematic diagram of a configuration of when the "Multiple Line Appearances" feature is used in accordance with the present invention.

Activating of the computer PC and communication device KE is then resumed in FIG. 11 and one of the assigned IP addresses IP1, IP3 released so that the computer PC and first terminal EE1 only use one common IP address in the system. After receiving the message MM3 the first terminal EE1 therein sends the message MM4 to the gatekeeper GK for deregistering the third IP address IP3. Said gatekeeper GK deletes all entries for the third IP address IP3 from the gatekeeper table TAB1, in particular the assignment of the third directory number RN3 to the third IP address IP3 and to the fourth network port P4. The first terminal EE1 furthermore conveys the message MM5 for releasing the third IP address IP3 to the DHCP server DHCP. Said server DHCP server DHCP deletes the entry for the third IP address IP3 from the DHCP table TAB3. The assignment of the third IP address IP3 to the first MAC address MAC1 is thereby canceled.

The communication device KE thereupon updates the communication-setup table TAB2 by assigning the network port P2 the first MAC address MAC1. The entry for the first network port P1 is deleted. As a result, connections are thereupon conveyed via the communication device KE to the first and second terminal EE1, EE2 using only one common IP address, which in the present exemplary embodiment is the first IP address IP1.

Figure 12:
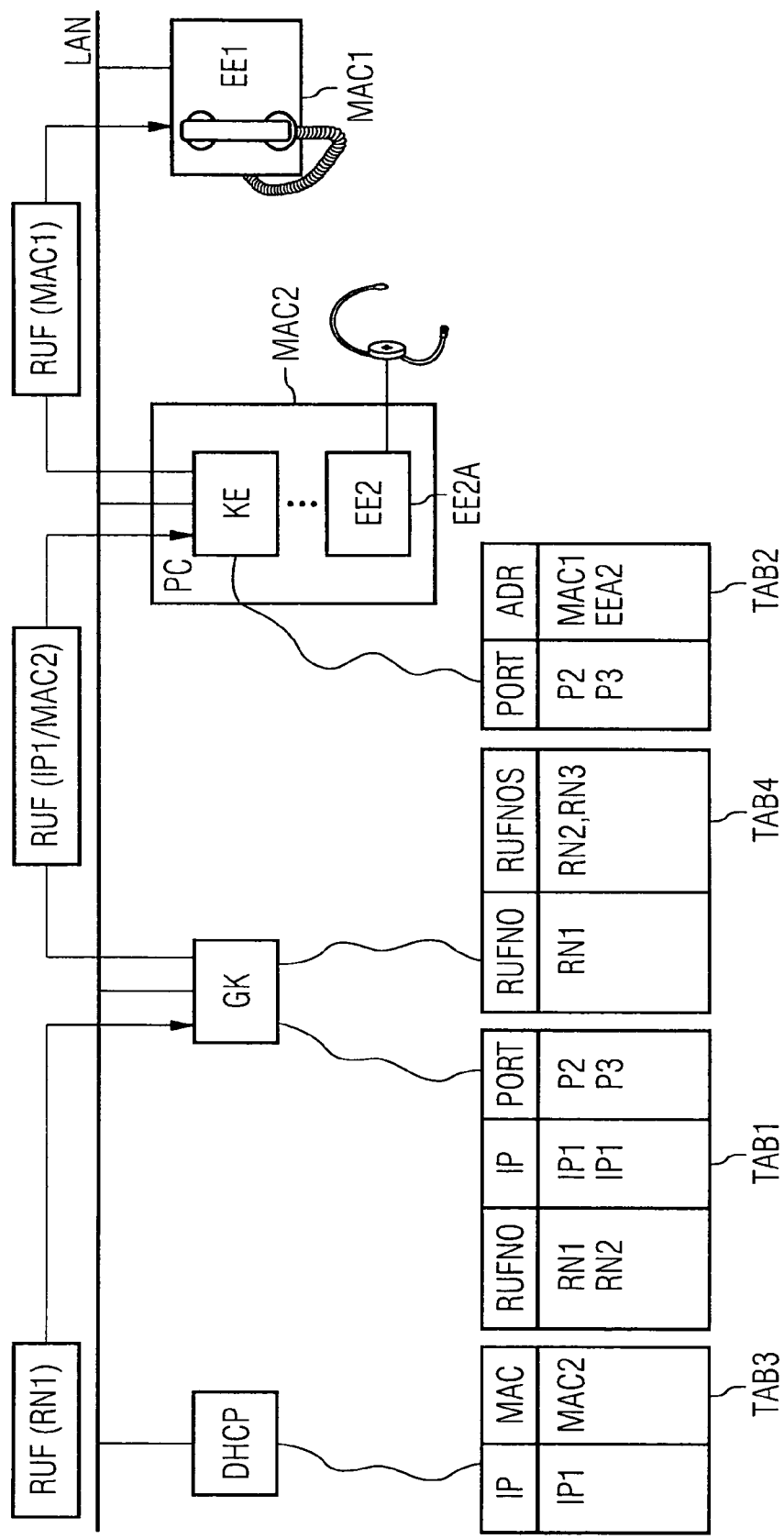
FIG. 12 is another exemplary schematic diagram of a configuration of when the "Multiple Line Appearances" feature is used in accordance with the present invention.

A connection setup of said type is illustrated in FIG. 12. The connection RUF addressed via the directory number RN1 is switched to the gatekeeper GK. Said gatekeeper GK determines the assignment of the directory number RN1 to the first IP address IP1 and to the second network port P2 from the gatekeeper table TAB1 and via said address, or via the second MAC address MAC2 assigned to the first IP address IP1, sets up the connection RUF to the communication device KE. The first MAC address MAC1 is determined there from the second network port P2 conveyed. The connection RUF is set up to said address by the communication device KE. The connection RUF has thus been set up to the first terminal EE1.

The connection RUF can alternatively or additionally be switched to the second terminal EE2.

Addressing of the incoming connection RUF can alternatively take place using the second directory number RN2 or third directory number RN3. This can be carried out analogously by evaluating the configuration tables shown in the Figures.

Figure 13:
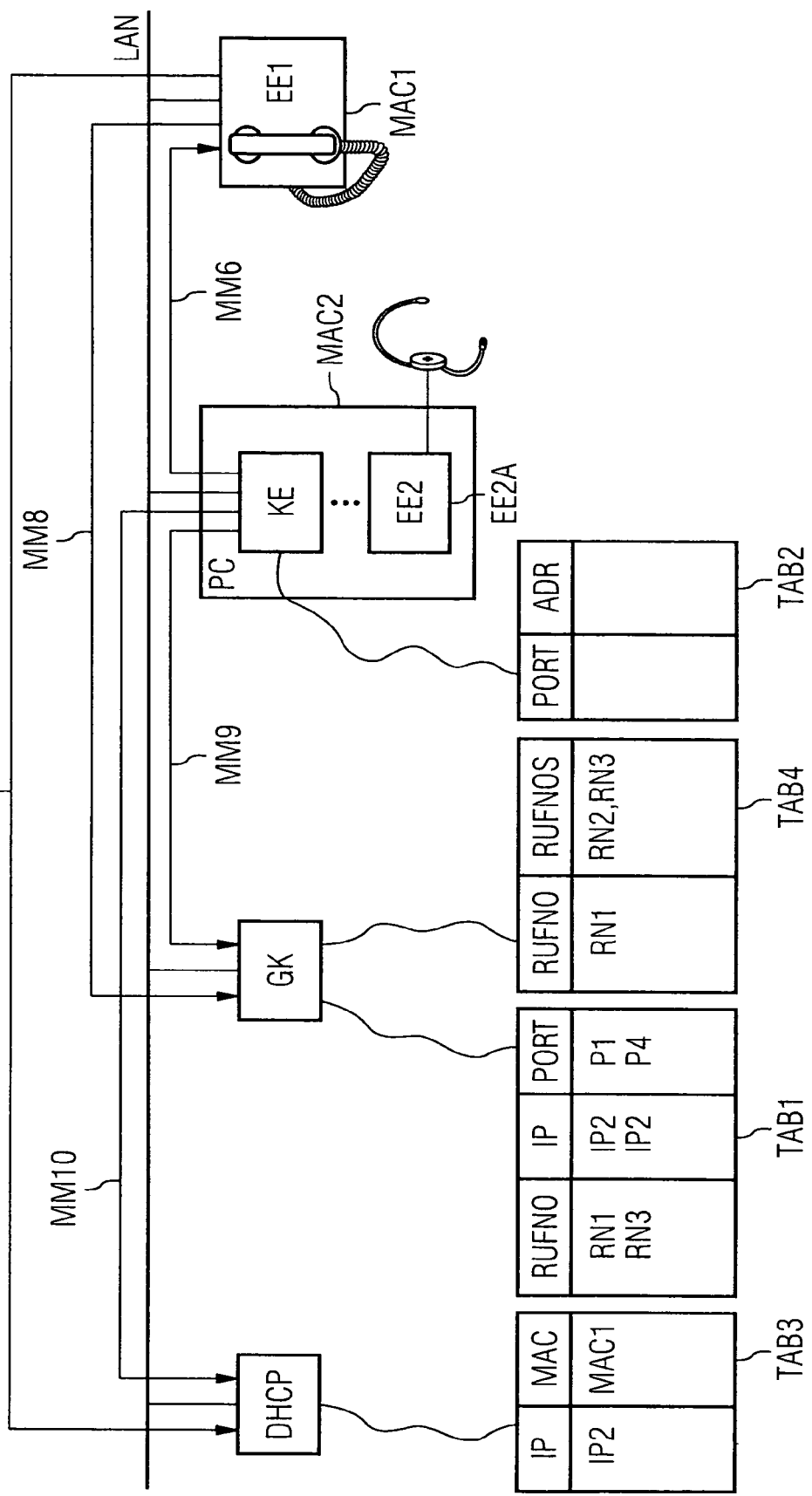
FIG. 13 is another exemplary schematic diagram of a configuration of when the "Multiple Line Appearances" feature is used in accordance with the present invention.

Deactivating of the computer PC proceeding from the configuration shown in FIG. 11 is illustrated in FIG. 13. For this purpose the computer PC sends the message MM6 to the first terminal EE1 to inform it of the deactivation about to take place. Said first terminal EE1 sends a log-on message MM7 to the DHCP server DHCP so that two entries are temporarily stored in the DHCP table TAB3. In this procedural step these are the first IP address IP1, which is assigned to the second MAC address MAC2, and the second IP address IP2, which is assigned to the first MAC address MAC1. The first terminal EE1 then sends a log-on message MM8 to the gatekeeper GK so that this will assign the second IP address IP2 to the directory number RN1 and to the third directory number RN3 together with unique hardware ports P1 or P4 that are valid for and control the first terminal EE1. Four entries are thus temporarily present there, namely the assignment of the directory number RN1 to the first IP address IP1 and second hardware port P2, the assignment of the second directory number RN2 to the first IP address IP1 and third hardware port P3, the assignment of the directory number RN1 to the second IP address IP2 and first hardware port P1, and the assignment of the third directory number RN3 to the second IP address IP2 and fourth hardware port P4. The table contents of this intermediate step are not shown in FIG. 13.

In what proceeds, as part of the deactivating process the communication device KE sends a message MM9 to the gatekeeper GK in order to delete the entries for the first IP address IP1 and hence, inter alia, cancel the assignment of the second directory number RN2 to the first IP address IP1. The communication-setup table TAB1 will hence only contain two entries for the directory number RN1 and third directory number RN3. The computer PC then sends a message MM10 to the DHCP server DHCP for releasing the henceforth no longer required first IP address IP1. Thus only the assignment of the second IP address IP2 to the first MAC address MAC1 will remain in the DHCP table TAB3. A system status corresponding to that illustrated by FIG. 8 is hence assumed.

What is likewise advantageous in deactivating the computer is that the first terminal EE1 or both terminals EE1, EE2 remain(s) accessible at each procedural step. The brief use of two IP addresses is terminated again after a few procedural steps so that only a single IP address will once more be reserved on completion of deactivating.

A further advantage of the procedural steps illustrated in FIGS. 8-13 is that no or only a slight delay will occur in the flow of the procedural steps even when a plurality of terminals and computers are activated simultaneously.

The communication system and/or DHCP server DHCP is preferably configured in such a way that when the "Multiple Line Appearances" feature is employed a pool of temporary IP addresses will be reserved that will then be jointly available while the communication device KE is being activated and/or deactivated and can be used jointly by simultaneously executing inventive methods for a plurality of terminals and/or communication devices.

Figure 14:
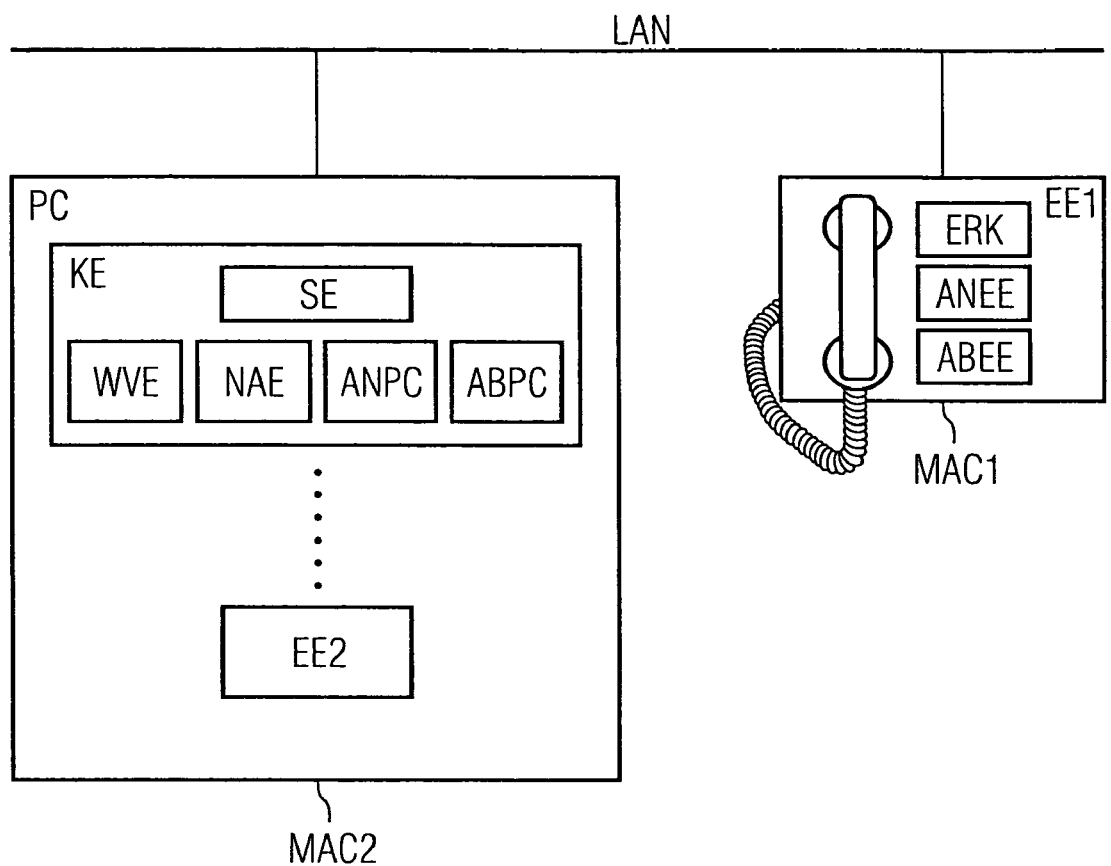
FIG. 14 is a schematic of the components of the inventive communication device and inventive terminal.

FIG. 14 is a schematic of the inventive communication device KE and inventive first terminal EE1 by both of which the procedural steps shown in the preceding Figures are executed. FIG. 14 therein includes a section of the communication system shown in FIGS. 1-6 and 8-13.

The communication device KE is part of the computer PC and includes a server device SE for calling up a further-switching unit WVE, assigned to a network port, as a result of an incoming partial connection addressed via a directory number and depending on the network port conveyed. Said server device SE can in particular be an operating-system function of the computer PC by which function the incoming connections are transferred on the basis of the addressed network port to various software components of the PC, for example an FTP client, a mail browser, an SMTP client, a database driver, or the further-switching unit WVE, assigned to said network port. A network port has been assigned one or more further-switching units WVE, with its being possible for a plurality of network ports to have been assigned to one common further-switching unit WVE or in each case to one specific further-switching unit WVE from among a plurality of such units.

In the present exemplary embodiment let there be precisely one further-switching unit WVE which in particular performs the function of further switching a partial connection arriving at the communication device KE to the first terminal EE1, with said further-switching unit WVE determining the first MAC address MAC1 on the basis of, for example, a preceding configuration of the communication device KE in the case of an incoming connection to the first terminal EE1.

When the first MAC address MAC1 has been determined the further-switching unit WVE addresses the first terminal EE1 using said first MAC address MAC1 and further switches the partial connection to the first terminal EE1. Each ensuing instance of data traffic forming part of a signaling and/or useful-data connection to the first terminal EE1 will be forwarded to the first terminal EE1 via the further-switching unit WVE.

The communication device KE further includes other components that are called up as part of the process of activating and/or deactivating the communication device KE. One of these is a network-address-determining unit NAE for assigning a fixed second MAC address MAC2 assigned to the communication device KE or computer PC to an IP address and/or for interrogating the IP address with, in particular, messages being sent to and received by a DHCP server located in the network.

The communication device KE further includes a log-on and a log-off unit at a gatekeeper for assigning or canceling the assignment of the directory number to the IP address and network port. The log-on unit is therein called up as part of the process of activating the communication device KE and then sends a registration message to the gatekeeper in order to assign the IP address of the computer PC to the directory number and to indicate the network port of the computer PC that is valid for the further switching of connections.

The log-off unit is called up as part of the process of deactivating the communication device KE and then sends a deregistration message to the gatekeeper in order to cancel the assignment of the directory number to the IP address of the computer PC and/or to the network port.

The inventive first terminal EE1 shown schematically in FIG. 14 having the first MAC address MAC1 is coupled to a packet-oriented network LAN directly or via a switch (not shown). If the communication device KE is not active or not present in the communication system, then the first terminal EE1 has been assigned the IP address. It has furthermore been assigned the directory number via which it can be logically addressed. Depending on the network port addressed, incoming connections to the first MAC address MAC1 can be forwarded either to an internal application, such as an FTP client for updating a software version or an HTTP client for configuring the first terminal EE1, or to a component accepting the connection.

The first terminal EE1 further includes components that detect activating and/or deactivating of the communication device KE belonging to the first terminal EE1 and execute steps within the scope of the cited method. A detection unit ERK of the first terminal EE1 detects activating and/or deactivating of the communication device KE. This is done in particular by way of receiving and processing an incoming message from the communication device KE or through regular sending of a polling message to the communication device KE, with deactivating of the communication device KE being detected from the absence of an associated confirmatory response. Activating of the communication device KE is detected from a first reception of associated confirmatory responses. Especially when the first terminal EE1 is directly physically coupled to the communication device KE via only passive network elements, activating and/or deactivating can be detected from a reception or absence of data-transport messages from said communication device KE. A "link up" or "link down" of the communication device can preferably be detected, for example at an input of a switch contained in the first terminal EE1.

The first terminal EE1 further includes a log-on unit for logging the first terminal EE1 on to the gatekeeper depending on deactivating of the communication device KE being detected. A registration message is conveyed to the gatekeeper as part of the log-on process, with the IP address of the network port of the connection-accepting component of the first terminal EE1 being co-sent as the parameter.

The first terminal EE1 further includes a log-off unit for logging the first terminal EE1 off from the gatekeeper depending on activating of the communication device KE being detected. A deregistration message is conveyed to the gatekeeper as part of the log-off process, with at least the IP address being co-sent.

The invention claimed is:

1. A method for setting up a connection to a first terminal that is coupled to a communication device and is also coupled to a connection controller, comprising:
   providing a directory number assigned to a first terminal which is used to logically address the first terminal for a connection;
   providing a first terminal hardware address in order to access the first terminal;
   providing a first communication device hardware address in order to access the communication device;
   assigning the first communication device hardware address to a first network address;
   assigning by the connection controller the first network address and an additional information to the directory number, the additional information selected from the group consisting of a type of protocol used by the first terminal and a port for the first terminal;
   assigning by the communication device the additional information to the first terminal hardware address; and
   setting up the connection to the first terminal comprising:
      determining by the connection controller that a communication request identifies the directory number, the connection controller determining that the directory number is assigned to the first network address, setting up a partial connection to the first communication device based on the determined first network address, the additional information being conveyed to the first communication device during the setting up of the partial connection, the first communication device determining a terminal hardware address based on the conveyed additional information, and the first communication device forwarding data received via the partial connection to the first terminal based on the determined terminal hardware address.

2. The method according to claim 1 further comprising providing a communication unit that comprises the first communication device connected to the first terminal.

3. The method according to claim 1, wherein when the first communication device is deactivated, the method further comprising:
   assigning the first network address to the first terminal hardware address; and
   assigning by the connection controller the directory number to the first network address such that when the connection controller receives a communication request identifying the directory number, the connection controller determines that the directory number is assigned to the first network address and sets up a connection to the first terminal based on the first network address.

4. The method according to claim 2, wherein the first communication device is coupled to the first terminal such that an activation or a deactivation of the first communication device is detected by the first terminal.

5. The method according to claim 1, the method further comprising:
   the first communication device sending to the connection controller a log-off message for releasing the first network address when the first communication device is deactivated; and
   the first terminal sending to the connection controller a log-on message for assigning the first network address to the first terminal when or after the first communication device is deactivated.

6. A method for setting up a connection to a first terminal that is coupled to a communication device and is also coupled to a connection controller, the first communication device comprised of a second terminal having a second terminal vector address, the method comprising:
   providing a directory number assigned to a first terminal which is used to logically address the first terminal for a connection;
   providing a first terminal hardware address in order to access the first terminal;
   providing a first communication device hardware address in order to access the communication device;
   assigning the first communication device hardware address to a first network address;
   assigning by the connection controller the first network address and a first an additional information to the directory number, the first additional information selected from the group consisting of a type of protocol used by the first terminal and a port for the first terminal;
   assigning by the communication device the first additional information to the first terminal hardware address; and setting up the connection to the first terminal comprising: determining by the connection controller that a communication request identifies the directory number, the connection controller determining that the directory number is assigned to the first network address, setting up a partial connection to the first communication device based on the determined first network address, the first additional information being conveyed to the first communication device during the setting up of the partial connection, the first communication device determining a terminal hardware address based on the conveyed first additional information, and the first communication device forwarding data received via the partial connection to the first terminal based on the determined terminal hardware address;

when or after the first communication device is deactivated: assigning the first network address to the first terminal hardware address, and assigning by the connection controller the directory number to the first network address and to the first additional information such that when a communication request identifying the directory number is received by the connection controller, the connection controller determines that the first network address is assigned to the directory number and sets up a connection to the first terminal based on the first network address; and when or after the first communication device is activated: the connection controller canceling the assignment of the first network address to the first terminal address and assigning by the connection controller the directory number to the first network address and to a second additional information identifying the second terminal vector address, the second additional information selected from the group consisting of a type of protocol used by the second terminal and a port for the second terminal.

7. The method according to claim 1, the method further comprising:

providing an address server for administering and allocating network addresses; and when the first communication device is deactivated: sending a log-off message from the first communication device to the address server for releasing the first network address, and the first terminal sending a log-on message to the address server for assigning the first network address to the first terminal hardware address; and when the first communication device is activated: sending a log-off message from the first terminal to the address server for releasing the first network address, and the first communication device sending a log-on message to the address server for assigning the first network address to the first communication device hardware address.

8. The method according to claim 7 wherein the first terminal is comprised of a switch attached to a telephone and wherein the communication device is a computer connected to the switch of the first terminal.

9. The method according to claim 1 wherein the first terminal is comprised of a switch attached to a telephone and wherein the communication device is a computer connected to the switch of the first terminal.

10. The method according to claim 1 the method further comprising:

assigning at least one second directory number to the first directory number by the connection controller such that connection requests identifying the at least one second directory number initiates the setting up the connection to the first terminal.

11. The method according to claim 10, the method further comprising:

assigning at least one second directory number to the first network address by the connection controller such that connection requests identifying the at least one second directory number received by the connection controller initiates the setting up the connection to the first terminal.

12. The method according to claim 1 the method further comprising:

when or after the first communication device is deactivated: assigning a second network address to the first terminal hardware address by the connection controller and canceling by the connection controller the assignment of the at least one second directory number to the first network address and canceling the assignment of the first network address to the first communication device hardware address; and canceling the assignment of the directory number to the first network address and assigning the directory number and at least one second directory number to the second network address such that a communication request identifying the directory number or the at least one second directory number that is received by the connection controller causes the connection controller to set up a connection with the first terminal based on the second network address.

13. The method according to claim 12, the method further comprising:

when or after the first communication device is activated: canceling the assignment of the second network address to the first terminal hardware address and canceling the assignment of the directory number and at least one second directory number to the second network address.

* * * * *